(12) United States Patent
Weiss et al.

(10) Patent No.: US 8,063,125 B2
(45) Date of Patent: Nov. 22, 2011

(54) FAST-GELLING PLASTICIZER PREPARATIONS

(75) Inventors: Thomas Weiss, Ilvesheim (DE); Melanie Wiedemeier, Dormagen-Delhoven (DE); Jan-Gerd Hansel, Bergisch Gladbach (DE)

(73) Assignee: Lanxess Deutschland GmbH, Leverkusen (DE)

( * ) Notice: Subject to any disclaimer, the term of this patent is extended or adjusted under 35 U.S.C. 154(b) by 484 days.

(21) Appl. No.: 12/208,441

(22) Filed: Sep. 11, 2008

(65) Prior Publication Data

US 2009/0197998 A1 Aug. 6, 2009

(30) Foreign Application Priority Data

Sep. 19, 2007 (DE) .................. 10 2007 044 689

(51) Int. Cl.
 *C08K 5/42* (2006.01)
(52) U.S. Cl. .................. 524/158; 524/288; 524/292
(58) Field of Classification Search .................. None
 See application file for complete search history.

(56) References Cited

U.S. PATENT DOCUMENTS

| 4,060,508 A | * | 11/1977 | Sugahara et al. | 523/440 |
| 2005/0049341 A1 | * | 3/2005 | Grass et al. | 524/306 |

FOREIGN PATENT DOCUMENTS

| JP | 2002-322337 | * | 4/2001 |
| JP | 2004-083665 | * | 8/2002 |
| JP | 2003165884 | | 6/2003 |

OTHER PUBLICATIONS

Machine translation of JP 2004-083665.*
Machine translation of JP 2002-322337.*
L. Meier: "Weichmacher" ["Plasticizers"], in R. Gächter, H. Müller (Ed.): Taschenbuch der Kunststoffadditive [Plastics additives handbook], 3rd Edition, pp. 361-362, 397, Hanser Verlag, Munich 1990.
European Search Report from co-pending Application EP08163941 dated Nov. 18, 2010, 4 pages.

* cited by examiner

*Primary Examiner* — Milton I Cano
*Assistant Examiner* — Wenwen Cai
(74) *Attorney, Agent, or Firm* — Michael A. Miller

(57) ABSTRACT

The invention relates to fast-gelling plasticizer preparations comprising at least one aryl alkylsulfonate of the formula $R^1$—$SO_2$—O—$R^2$ and at least one diol dibenzoate of the general formula $R^3C(O)O$—Y—$O(O)CR^4$ and/or at least one dibenzyl dicarboxylate of the general formula $R^3CH_2O(O)C$—Z—$C(O)OCH_2R^4$, and also to its use as plasticizer in plastics, and to plastics which comprise these plasticizer preparations.

13 Claims, No Drawings

FAST-GELLING PLASTICIZER PREPARATIONS

The invention relates to fast-gelling plasticizer preparations comprising at least one aryl alkylsulfonate of the formula $R^1—SO_2—O—R^2$ and at least one diol dibenzoate of the general formula $R^3C(O)O—Y—O(O)CR^4$ and/or at least one dibenzyl dicarboxylate of the general formula $R^3CH_2O(O)C-Z-C(O)OCH_2R^4$, and also to its use as plasticizer in plastics, and to plastics which comprise these plasticizer preparations.

BACKGROUND OF THE INVENTION

For decades, plasticizers have been used for processing plastics, such as polyvinyl chloride. Recently, the requirements placed upon the plasticizers have become more stringent with respect to performance and non-toxicity to humans and the environment. One important requirement relates to minimum solution temperature and gel time. Solution temperature in the context of plasticizers is the temperature at which a homogeneous phase is formed from a polyvinyl chloride dispersion in a plasticizer (L. Meier: "Weichmacher" ["Plasticizers"], in R. Gächter, H. Müller (Ed.): *Taschenbuch der Kunststoffadditive* [Plastics additives handbook], 3rd Edition, pp. 361-362, Hanser Verlag, Munich 1990). Plasticizers with a low gel time permit fast processing that saves energy.

In the prior art, applications which require fast gelling use predominantly alkyl benzyl esters of aromatic polycarboxylic acids, an example being butyl benzyl phthalate (L. Meier: "Weichmacher" ["Plasticizers"], in R. Gächter, H. Müller (Ed.): *Taschenbuch der Kunststoffadditive* [Plastics additives handbook], 3rd Edition, p. 397, Hanser Verlag, Munich 1990).

However, the demands placed upon modern plasticizers include low volatility, as well as a low solution temperature. The volatility of plasticizers leads to undesired embrittlement, for example of flexible polyvinyl chloride, and also to pollution by what are known as volatile organic substances (VOCs), the intention being to avoid these in applications in close contact with consumers.

European Union Directive 2005/84/EC for phthalates imposes certain restrictions on the use of diisononyl phthalate (DINP), di(isodecyl)phthalate (DIDP), and di-n-octyl phthalate (DNOP) for the production of childrens' toys which have small parts. It also provides for a total ban on the use of di(2-ethylhexyl) phthalate (DEHP), butyl benzyl phthalate (BBP), and dibutyl phthalate (DBP) at concentrations greater than 0.1% for childrens' toys. Producers of PVC plasticizers reacted to this new Directive by developing phthalate-free alternatives, such as diisononyl hexahydrophthalate (Hexamoll® DINCH) from BASF AG. Other phthalate-free plasticizers are aryl alkylsulfonates (Mesamoll®, Lanxess Deutschland GmbH) or esters of benzoic acid (Benzoflex® grades, Velsicol Chemical Corp.), and these are in successful use.

However, many of these phthalate-free alternatives exhibit less-than-ideal property profiles, which accordingly can be improved for use as PVC plasticizers. A targeted change in the property profile of aryl alkylsulfonates, without impairing their favorable properties, is of great interest to their users. This can be achieved, for example, via use of small additions of additional components.

The object of the present invention consisted in finding phthalate-free plasticizer preparations which feature lower volatility than that of the individual components and which moreover have lower gel times than would be expected from a linear relationship between the individual components.

Surprisingly, it has now been found that phthalate-free plasticizer preparations of a mixture composed of at least one aryl alkylsulfonate and of at least one ester of benzoic acid with polyhydric alcohols exhibit such properties, as also do plasticizer preparations of a mixture composed of at least one aryl alkylsulfonate and of benzyl esters of polybasic aliphatic carboxylic acids, e.g. dibenzyl adipate.

SUMMARY OF THE INVENTION

This invention therefore provides phthalate-free plasticizer preparations comprising a) from 1 to 98% by weight of at least one aryl alkylsulfonate of the formula $R^1—SO_2—O—R^2$ and
b) from 2 to 99% by weight of at least one diol dibenzoate of the general formula $R^3C(O)O—Y—O(O)CR^4$ or of at least one dibenzyl dicarboxylate of the general formula $R^3CH_2O(O)C—Z—C(O)OCH_2R^4$ or a mixture of the formulae $R^3C(O)O—Y—O(O)CR^4$ and $R^3CH_2O(O)C—Z—C(O)OCH_2R^4$, where the total of the percentages by weight of all of the components of the preparation is 100% and in which $R^1$ is a straight-chain or branched $C_1$-$C_{20}$-alkyl radical,
$R^2$ is a phenyl radical optionally substituted with $C_1$-$C_4$-alkyl or with halogen,
Y is an alkylene radical optionally containing ether groups and having at least 2 carbon atoms, preferably a $C_2$-$C_{10}$-alkyl radical optionally containing up to five ether groups,
each of $R^3$ and $R^4$ independently of the other is a phenyl radical optionally substituted with $C_1$-$C_4$-alkyl or with halogen, and
Z is a saturated or unsaturated, straight-chain or branched, cyclic or polycyclic $C_2$-$C_{10}$-hydrocarbon radical, where the total of the percentages by weight of all of the components in the plasticizer preparation is 100%.

For clarification it may be noted that the scope of the invention encompasses all of the definitions and parameters mentioned and listed below in general terms or in preferred ranges, in any desired combination.

In one preferred embodiment of the present invention, the radical $R^1$ is a $C_1$-$C_{20}$-alkyl radical.

In another preferred embodiment of the present invention, the radical Z derives structurally from succinic acid, glutaric acid, adipic acid, pimelic acid, suberic acid, azelaic acid or sebacic acid. Z here is the alkylene units between the carboxy radicals.

In one particularly preferred embodiment of the invention, the ester of the structure $R^3C(O)O—Y—O(O)CR^4$ is diethylene glycol dibenzoate, triethylene glycol dibenzoate, dipropylene glycol dibenzoate, or tripropylene glycol dibenzoate.

In another particularly preferred embodiment of the invention, the ester of the structure $R^3CH_2O(O)C—Z—C(O)OCH_2R^4$ is dibenzyl adipate.

In one preferred plasticizer preparation, the content of component a) aryl alkylsulfonate is from 70 to 98% by weight, very particularly preferably from 80 to 98% by weight.

The inventive plasticizer preparations can be prepared via mixing of the aryl alkylsulfonates known per se of component a) in the stated ratio with the components b).

The mixtures composed of the components a) and b) can be characterized via their physical properties. For this, use can be made of the solution temperature for PVC, the viscosity and volatility, and the gel time for PVC plastisols. The methods for determining properties are explained in the experimental examples.

The invention also encompasses the use of the inventive plasticizer preparations in plastics, preferably polyvinyl chloride, vinyl-chloride-based copolymers, polyvinylidene chloride, polyvinyl acetals, polyacrylates, polyamides, polyurethanes, polylactides, polylactic acids, cellulose or its derivatives, rubber polymers, such as acrylonitrile-butadiene rubber, hydrogenated acrylonitrile-butadiene rubber, chloroprene rubber, chlorinated polyethylene, chlorosulfonylpolyethylene, ethylene-propylene rubber, acrylate rubber and or epichlorohydrin rubber. Polyvinyl chloride is preferred.

However, the invention also provides plastics, preferably polyvinyl chloride, vinyl-chloride-based copolymers, polyvinylidene chloride, polyvinyl acetals, polyacrylates, polyamides, polyurethanes, polylactides, polylactic acids, cellulose and its derivatives, rubber polymers, such as acrylonitrile-butadiene rubber, hydrogenated acrylonitrile-butadiene rubber, chloroprene rubber, chlorinated polyethylene, chlorosulfonylpolyethylene, ethylene-propylene rubber, acrylate rubber and/or epichlorohydrin rubber, preferably polyvinyl chloride, which comprise the fast-gelling phthalate-free plasticizer preparations.

The polyvinyl chloride preferred according to the invention is preferably prepared here via homopolymerization from vinyl chloride by methods known to the person skilled in the art, such as suspension polymerization, emulsion polymerization or bulk polymerization. The inventive plasticizer preparations are preferably used in mixtures with from 20 to 99% by weight of polymer, preferably from 45 to 95% by weight of polymer, particularly preferably from 50 to 90% by weight of polymer. In the case of the polyvinyl chloride preferred according to the invention, these mixtures are termed flexible polyvinyl chloride.

The plastics provided with the inventive plasticizer preparation, and therefore also the polyvinyl chloride preferred according to the invention, can also comprise, alongside the inventive plasticizer preparations, other suitable additives. In one preferred embodiment, the additives used can comprise light stabilizers and other stabilizers, lubricants, fillers, pigments, flame retardants, blowing agents, polymeric processing aids, impact modifiers, optical brighteners, antistatic agents and/or biostabilizers.

Some suitable additives are described in more detail below. However, the examples listed do not restrict the inventive mixtures but serve merely for illustration.

The stabilizers c) to be used in one preferred embodiment in addition to components a) and b) neutralize the acids eliminated during and/or after the processing of the polymer/polyvinyl chloride, in particular hydrochloric acid. The stabilizers that can be used comprise any of the conventional polymer/polyvinyl chloride stabilizers in solid or liquid form, particular preference being given to conventional epoxy/zinc, Ca/Zn, Ba/Zn, Pb, or Sn stabilizers, and also to acid-binding phyllosilicates, preferably hydrotalcite. From 0.05 to 7% by weight, preferably from 0.1 to 5% by weight, particularly preferably from 0.2 to 4% by weight, and in particular from 0.5 to 3% by weight, of stabilizers can be used alongside the inventive plasticizer preparation in the inventive plastics.

The lubricants d) to be used in addition to components a) and b) and, if appropriate, c), or as alternative to c), in another, or an alternative, preferred embodiment are intended to be effective between the polymer/polyvinyl chloride particles and to counteract frictional forces during mixing, plastification and deformation. The lubricants d) present in the plastics comprising the inventive plasticizer preparations can comprise any of the lubricants conventionally used for the processing of plastics. Those that can be used with preference are hydrocarbons, such as oils, paraffins and polyethylene waxes, fatty alcohols having from 6 to 20 carbon atoms, ketones, carboxylic acids, such as fatty acids and montanic acids, oxidized polyethylene wax, metal salts of carboxylic acids, carboxamides and carboxylic esters, for example with the alcohols ethanol, fatty alcohols, glycerol, ethanediol, and pentaerythritol, and long-chain carboxylic acids as acid component. The content that can be used of lubricants d) to be used according to the invention is from 0.01 to 10% by weight, preferably from 0.05 to 5% by weight, particularly preferably from 0.1 to 3% by weight and in particular from 0.2 to 2% by weight, alongside the inventive plasticizer preparation in the plastic.

The fillers e) to be used in another, or an alternative, preferred embodiment, in addition to components a), b), and, if appropriate, c) and c) or d), or instead of c) or d), mainly have a favorable effect on compressive strength, tensile strength, and flexural strength, and also the hardness and heat resistance of plasticized polymer or of plasticized polyvinyl chloride or polyvinyl bromide. For the purposes of the invention, the fillers e) present in the mixtures can preferably comprise carbon black and/or other inorganic fillers, preferably natural calcium carbonates, particularly preferably chalk, limestone or marble, synthetic calcium carbonates, dolomite, silicates, silica, sand, diatomaceous earth, aluminum silicates, preferably kaolin, mica and feldspar. The fillers used particularly preferably comprise calcium carbonates, chalk, dolomite, kaolin, silicates, talc, or carbon black. The inventive plastics can comprise from 0.01 to 80% by weight, preferably from 0.1 to 60% by weight, particularly preferably from 0.5 to 50% by weight, and in particular from 1 to 40% by weight, of the fillers e), alongside the inventive plasticizer preparation.

The pigments f) to be used in another, or an alternative, preferred embodiment, in addition to components a), b), and, if appropriate, c), d), and/or e), or instead of c), d) or e) serve to adapt the resultant plastics product to various possible uses. For the purposes of the present invention it is possible to use either inorganic pigments or else organic pigments as component f). Preferred inorganic pigments used are cadmium pigments, in particular CdS, cobalt pigments, in particular $CoO/Al_2O_3$, chromium pigments, in particular $Cr_2O_3$. Preferred organic pigments used are monoazo pigments, condensed azo pigments, azomethine pigments, anthraquinone pigments, quinacridones, phthalocyanine pigments, dioxazine pigments or aniline pigments. The content that can be used of pigments f) to be used according to the invention is from 0.01 to 10% by weight, preferably from 0.05 to 5% by weight, particularly preferably from 0.1 to 3% by weight and in particular from 0.5 to 2% by weight, alongside the plasticizer preparation in the plastic produced therefrom.

The flame retardants g) to be used in another, or an alternative, preferred embodiment, in addition to components a), b), and, if appropriate, c), d), e) and/or f), or instead of c), d), e) or f) serve to reduce the flammability of the substrates to be produced from the polymers and from the plasticizer components, and to reduce smoke generation during combustion, The flame retardants preferably used comprise antimony trioxide, phosphate esters, chloroparaffin, aluminum hydroxide, boron compounds, molybdenum trioxide, ferrocene, calcium carbonate, or magnesium carbonate, The content that can be used of flame retardants g) to be used according to the invention is from 0.01 to 30% by weight, preferably from 0.1 to 25% by weight, particularly preferably from 0.2 to 20% by weight and in particular from 0.5 to 15% by weight in the plastic comprising the inventive plasticizer preparation.

The light stabilizers h) to be used in another, or in an alternative, preferred embodiment, in addition to components a), b) and, if appropriate, c), d), e), f) and/or g), or instead of c), d), e), f) or g), serve to protect plastics articles to be produced therefrom from damage in the region of the surface via the effect of light. The light stabilizers used preferably comprise hydroxybenzophenones or hydroxyphenylbenzotriazoles, the content used of these in turn being from 0.01 to 7% by weight, preferably from 0.1 to 5% by weight, particularly preferably from 0.2 to 4% by weight, and in particular from 0.5 to 3% by weight, based on the entire composition of the plastics item.

All of the % data in this application are % by weight unless otherwise stated.

The further plasticizers i) to be used in another, or an alternative, preferred embodiment, in addition to components a), b), and, if appropriate, c), d), e), f), g), and/or h), or instead of c), d), e), f), g) or h) are preferably monoalkyl esters of benzoic acid, benzoic diesters of mono-, di-, tri- or polyalkylene glycols, dialkyl esters of aliphatic diacids, dialkyl esters of aromatic diacids, trialkyl esters of aromatic triacids, phenyl esters of alkanesulfonic acids, alkyl or aryl esters of phosphoric acid, polyesters derived from dicarboxylic acids, or else a mixture thereof. Further plasticizers i) to be used with particular preference alongside the inventive plasticizer preparation in plastics are

- the monoalkyl esters of benzoic acid, e.g. isononyl benzoate,
- the dialkyl esters of aliphatic diacids, e.g. di(2-ethylhexyl) adipate, diisononyl adipate, di(2-ethylhexyl) sebacate, di(2-ethylhexyl) azelate, diisononyl cyclohexane-1,2-dicarboxylate,
- the trialkyl esters of aromatic triacids, e.g. trioctyl trimellitate,
- the alkyl or aryl esters of phosphoric acid, e.g. tri(2-ethylhexyl) phosphate, diphenyl 2-ethylhexyl phosphate, diphenyl cresyl phosphate, or tricresyl phosphate,
- polyesters, which by way of example can be prepared from dicarboxylic acids, such as adipic acid or phthalic acid, and from diols, such as 1,2-propanediol, 1,3-butanediol, 1,4-butanediol, or 1,6-hexanediol,
- alkylcarboxylates of glycerol.

For the purposes of the invention, the inventive plasticizer preparations can also be used in plastics mixtures which comprise further plastics selected from the group consisting of homo- and copolymers based on ethylene, propylene, butadiene, vinyl acetate, glycidyl acrylate, glycidyl methacrylate, acrylates and methacrylates having alcohol components of branched or unbranched $C_1$-$C_{10}$ alcohols, styrene, or acrylonitrile. Preference is given to polyacrylates having identical or different alcohol radicals from the group of the $C_4$-$C_8$ alcohols, particularly of butanol, hexanol, octanol, and 2-ethylhexanol, polymethyl methacrylate, methyl methacrylate-butyl acrylate copolymers, methyl methacrylate-butyl-methacrylate copolymers, ethylene-vinyl acetate copolymers, chlorinated polyethylene, nitrile rubber, acrylonitrile-butadiene-styrene copolymers, ethylene-propylene copolymers, ethylene-propylene-diene copolymers, styrene-acrylonitrile copolymers, acrylonitrile-butadiene rubber, styrene-butadiene elastomers, or methyl methacrylate-styrene-butadiene copolymers.

The plastics prepared with the inventive plasticizer preparations can be used for the production of, for example, pipelines, cables, wire sheathing, in internal fittings, or in the construction of vehicles or of furniture, or in floorcoverings, medical items, food packaging, gaskets, foils, composite foils, foils for laminated safety glass, in particular for the vehicle sector and the architectural sector, or in synthetic leather, toys, packaging containers, adhesive-tape foils, apparel, coatings, or else fibers for textiles.

The inventive plasticizer preparations have good processability because of their very low solution temperatures, and have low volatility.

The inventive plasticizer preparations and the process of this invention are illustrated by the examples below, which do not restrict the scope of the invention. [Data in percent by weight].

Determination of Solution Temperature

To determine the solution temperature, a few grains of Vinnol® H70 polyvinyl chloride, grain size <315 μm were mixed into one drop of the plasticizer to be tested, on a heatable microscope slide. The suspension was heated until a temperature had been reached at which the polyvinyl chloride appeared to be dissolved and transparent. This procedure was recorded through a microscope (Novex, AP-8, 40× magnification, electronic eyepiece for microscope 640×480: "MikrOkular II" PC eyepiece) as a function of time. The solution temperature was derived from a time-temperature calibration curve. Heating rate: $T=-0.0938t^2+7.2068t+31.684$, where t[min], T[° C.]; temperature-calibration curve: $T_2=0.9772T_1-0.994$; $T_1$=read-off temperature, $T_2$=actual temperature from melting point determinations of calibration substances. The method is based on a description by Bigg, D. C. H in J. Appl. Polym. Chem. 1975, 19, 1487.

Determination of Volatility

The amount of evaporable constituents was determined as a measure of volatility, via determination of weight difference. 10 g of the plasticizer here are placed in a thermostatic, cylindrical vessel (vacuum drying cabinet, 10 g of plasticizer, Al dish, diameter 10×height 2.5 cm; T=130° C.; t=6 h; P=60 mbar). Volatility was calculated as the average from two determinations. Values were also recorded for butyl benzyl phthalate as reference substance.

Determination of Gel Time

Gel time was determined from time-dependent viscosity measurements. The shear viscosity of a plastisol (milling: 100% by weight of Vestolit® B 7021 (PVC) with 60% by weight of plasticizer and 3% by weight of Irgastab® CZ 11 (stabilizer) for 2 min; deaeration 10 min; aging, 24 h, viscosity measurement) was measured at 70° C. here by means of a plate-and-plate rotation viscometer from Physica (MC 120; measurement system: MP 31 [50 mm]). So that the resultant conclusions were comparable in relation to gel time, the time recorded extended to achievement of 1 000 000 mPas. Short times indicate high gel rate.

Determination of Viscosity

Viscosity was measured using a rotation viscometer from Haake: Viscotester 2 plus. The rotation element here was introduced into the plasticizer mixture at 23° C., and the measurement was started. Viscosity stated at melting point in the case of melting solids.

It will be understood that the specification and examples are illustrative but not limitative of the present invention and that other embodiments within the spirit and scope of the invention will suggest themselves to those skilled in the art.

EXAMPLES

Mixture composed of Mesamoll® (phenyl $C_{12}$-$C_{20}$-alkylsulfonate) with diethylene glycol dibenzoate (source: Aldrich, 98% purity).

| Example | 1* | 2 | 3 | 4* |
|---|---|---|---|---|
| | Mixture proportions [% by weight] | | | |
| DEG dibenzoate [% by weight] | 0 | 10 | 20 | 100 |
| Mesamoll [% by weight] | 100 | 90 | 80 | 0 |
| | | Properties | | |
| Solution temperature [° C.] | 113 | 111 | 117 | 124 |
| Viscosity [mPas] at 25° C. | 125 | 97 | 92 | 86 |
| Volatility [% by weight] | 2.4 | 0.5 | 0.6 | 2.0 |
| Gel time to 1000000 mPas [min] | 8.7 | 4.3 | 3.3 | 1.0 |

*non-inventive

Mixture composed of Mesamoll® (phenyl $C_{12}$-$C_{20}$-alkylsulfonate) with dibenzyl adipate, 97% purity).

| Example | 1* | 5 | 6 | 7* |
|---|---|---|---|---|
| | Mixture proportions [% by weight] | | | |
| Dibenzyl adipate [% by weight] | 0 | 10 | 20 | 100 |
| Mesamoll [Gew %] | 100 | 90 | 80 | 0 |
| | | Properties | | |
| Solution temperature [° C.] | 113 | 116 | 117 | 148 |
| Viscosity [mPas] at 25° C. | 125 | 82 | 59 | 26(40° C.) |
| Volatility [% by weight] | 2.4 | 0.7 | 0.6 | 1.8 |
| Gel time to 1000000 mPas [min] | 8.7 | 3.5 | 3.0 | 1.3 |

*non-inventive

From the examples it is apparent that the volatility of the inventive plasticizer preparations is surprisingly lower than that of the starting materials. At the same time, a small addition of 20% of diethylene glycol dibenzoate or dibenzyl adipate ill phenyl alkylsulfonate preparations can shorten gel time by a factor of 2.6 and, respectively, 2.9. Viscosity falls here, thus improving processability, without any substantial increase in the solution temperature of the preparation.

What is claimed is:

1. A phthalate-free plasticizer preparation comprising
   a) from 70 to 98% by weight of at least one aryl alkylsulfonate of the formula $R^1$—$SO_2$—O—$R^2$ and
   b) from 2 to 30% by weight of at least one diol dibenzoate of the general formula $R^3C(O)O$—Y—$O(O)CR^4$ or of at least one dibenzyl dicarboxylate of the general formula $R^3CH_2O(O)C$—Z—$C(O)OCH_2R^4$ or a mixture of the formulae $R^3C(O)O$—Y—$O(O)CR^4$ and $R^3CH_2O(O)C$—Z—$C(O)OCH_2R^4$, where the total of the percentages by weight of all of the components of the preparation is 100% and in which
   $R^1$ is a straight-chain or branched $C_1$-$C_{20}$-alkyl radical,
   $R^2$ is a phenyl radical optionally substituted with $C_1$-$C_4$-alkyl or with halogen,
   Y is an alkylene radical optionally containing ether groups and having at least 2 carbon atoms,
   each of $R^3$ and $R^4$ independently of the other is a phenyl radical optionally substituted with $C_1$-$C_4$-alkyl or with halogen, and
   Z is a saturated or unsaturated, straight-chain or branched, cyclic or polycyclic $C_2$-$C_{10}$-hydrocarbon radical, where the total of the percentages by weight of all of the components in the plasticizer preparation is 100%.

2. A plastic comprises the phthalate-free plasticizer preparation of claim 1.

3. The phthalate-free plasticizer preparation according to claim 1, wherein the radical $R^1$ is a $C_{10}$-$C_{20}$-alkyl radical.

4. The phthalate-free plasticizer preparation according to claim 1, wherein the ester of the structure $R^3C(O)O$—Y—$O(O)CR^4$ is diethylene glycol dibenzoate, triethylene glycol dibenzoate, dipropylene glycol dibenzoate, or tripropylene glycol dibenzoate.

5. The phthalate-free plasticizer preparation according to claim 1, wherein the ester of the structure $R^3CH_2O(O)C$—Z—$C(O)OCH_2R^4$ is dibenzyl adipate.

6. The phthalate-free plasticizer preparation according to claim 1 or 2, wherein the radical Z derives from succinic acid, glutaric acid, adipic acid, pimelic acid, suberic acid, azelaic acid or sebacic acid.

7. The plastic as claimed in claim 2 comprising in addition to components a) and b), additives from the group of light stabilizers and other stabilizers, lubricants, fillers, pigments, flame retardants, blowing agents, polymeric processing aids, impact modifiers, optical brighteners, antistatic agents and/or biostabilizers, or else a mixture thereof.

8. The plastic as claimed in claim 2, which is polyvinyl chloride, vinyl-chloride-based copolymers, polyvinylidene chloride, polyvinyl acetals, polyacrylates, polyamides, polyurethanes, polylactides, polylactic acids, cellulose or its derivatives, or rubber polymers including acrylonitrile-butadiene rubber, hydrogenated acrylonitrile-butadiene rubber, chloroprene rubber, chlorinated polyethylene, chlorosulfonylpolyethylene, ethylene-propylene rubber, acrylate rubber or epichlorohydrin rubber.

9. A method of using the plastic of claim 2 comprising incorporating said plastic into articles for use in pipelines, cables, wire sheathing, in internal fittings, or in the construction of vehicles or of furniture, or in floor coverings, medical items, food packaging, gaskets, foils, composite foils, foils for laminated safety glass, in the vehicle sector, in the architectural sector, or in synthetic leather, toys, packaging containers, adhesive-tape foils, apparel, coatings, or else fibers for textiles.

10. The plastic according to claim 2, wherein the radical $R^1$ is a $C_{10}$-$C_{20}$-alkyl radical.

11. The plastic according to claim 2, wherein the ester of the structure $R^3C(O)O$—Y—$O(O)CR^4$ is diethylene glycol dibenzoate, triethylene glycol dibenzoate, dipropylene glycol dibenzoate, or tripropylene glycol dibenzoate.

12. The plastic according to claim 2, wherein the ester of the structure $R^3CH_2O(O)C$—Z—$C(O)OCH_2R^4$ is dibenzyl adipate.

13. The plastic according to claim 2, wherein the radical Z derives from succinic acid, glutaric acid, adipic acid, pimelic acid, suberic acid, azelaic acid or sebacic acid.

* * * * *